United States Patent
Yamazaki et al.

[11] Patent Number: 5,973,109
[45] Date of Patent: Oct. 26, 1999

[54] PROCESS FOR THE PREPARATION OF POLYMER SOLUTION

[75] Inventors: Hidekazu Yamazaki; Tadahiro Tsujimoto; Yukihiro Katai, all of Kanagawa, Japan

[73] Assignee: Fuji Photo Film Co., Ltd., Kanagawa, Japan

[21] Appl. No.: 08/902,955

[22] Filed: Jul. 30, 1997

Related U.S. Application Data

[63] Continuation-in-part of application No. 08/759,638, Dec. 5, 1996.

[30] Foreign Application Priority Data

Dec. 5, 1995 [JP] Japan ................................. 7-344614
Jul. 30, 1996 [JP] Japan ................................. 8-216769
Jul. 30, 1996 [JP] Japan ................................. 8-216772

[51] Int. Cl.⁶ .................................................. C08F 6/00
[52] U.S. Cl. ........................ 528/499; 528/502; 528/503
[58] Field of Search ................................. 528/499, 502, 528/503

[56] References Cited

U.S. PATENT DOCUMENTS 3,948,870  4/1976  Stoy et al. ................................. 528/494
4,581,431  4/1986  Yamazaki et al. ....................... 528/494
5,516,818  5/1996  Chen et al. ............................... 523/332

FOREIGN PATENT DOCUMENTS 07 23993A1  7/1996  European Pat. Off. .

OTHER PUBLICATIONS

J.M.G. Cowie et al., report in Makromol., The Dissolution and Stability of Cellulose . . . , 143, pp. 105–114 (1971).

K. Kamide et al., Textile Machinery Society, Dry Spinning of Cellulose Triacetate Filament Yarns . . . , vol. 34, pp. 57–61 (1981).

*Primary Examiner*—Terressa Mosley
*Attorney, Agent, or Firm*—Birch, Stewart, Kolasch & Birch, LLP

[57] ABSTRACT

A process for the preparation of a polymer solution comprises the steps of: mixing a polymer with a solvent to swell the polymer in the solvent; cooling the swelled mixture; and then warming the cooled mixture to dissolve the polymer in the solvent. The present invention uses a polymer other than cellulose esters of lower fatty acids to form the polymer solution.

17 Claims, 6 Drawing Sheets

PROCESS FOR THE PREPARATION OF POLYMER SOLUTION

CROSS-REFERENCE TO RELATED APPLICATION

This is a continuation-in-part application of U.S. patent application Ser. No. 08/759,638 filed on Dec. 5, 1996.

FIELD OF THE INVENTION

The present invention relates to a process for the preparation of a polymer solution.

BACKGROUND OF THE INVENTION

Polymers have been used in various technical fields. A polymer material such as a plastic film is formed by using a melt or solution of a polymer. A process of forming a polymer material comprises dissolving a polymer in a solvent to form a solution, forming a polymer material by using the solution, and drying the formed material by evaporating the solvent.

The solvent of a polymer is a liquid that can dissolve a polymer at a required concentration. The solvent also requires safety and an appropriate boiling point for evaporating the solvent from a formed polymer material. Recently, the solvent particularly requires safety of the human body and the environment. Therefore, it is now rather difficult to find out an appropriate solvent in liquids that can dissolve a polymer.

For example, methylene chloride has been used as a solvent of cellulose triacetate. However, the use of hydrocarbon halides such as methylene chloride has recently been restricted severely to protect the global environmental conditions. Further, methylene chloride may cause problems in the working environment.

On the other hand, acetone is a widely used organic solvent. Acetone has an appropriate boiling point (56° C.). Further, acetone has few problems on the human body and the global environmental conditions, compared with the other organic solvents. However, cellulose triacetate has a poor solubility in acetone. Cellulose triacetate can be swelled in acetone, but is scarcely dissolved in acetone.

J. M. G. Cowie et al. report in Makromol., Chem., 143 (1971) 105–114, that cellulose acetate having a substitution degree in the range of 2.70 (acetic acid content: 60.1%) to 2.80 (acetic acid content: 61.3%) is dissolved in acetone by a specific process. The process comprises the steps of cooling the cellulose acetate in acetone to a temperature of −80 to −70° C., and warming it to obtain 0.5 to 5 wt. % solution of the-cellulose acetate in acetone. The method of cooling a mixture of a polymer and a solvent to obtain a solution is hereinafter referred to as a cooling dissolution method.

The solution of cellulose acetate in acetone is also reported by K. Kamide et al., Textile Machinery Society, Vol. 34, 57–61 (1981). The report (written in Japanese) is entitled "Dry spinning process using acetone solution of triacetyl cellulose." In the report, the cooling dissolution method is applied to the art of fiber spinning. The experiments shown in the report examine the mechanical strength, the dyeing property and the cross sectional profile of the fiber obtained by the cooling dissolution method. In the report, 10 to 25 wt. % solution of cellulose acetate is used to form a fiber.

SUMMARY OF THE INVENTION

An object of the present invention is to dissolve a polymer in a solvent according to an improved cooling dissolution method, even if the polymer is swelled in, but is not dissolved in the solvent by a conventional dissolution method.

The present invention provides a process for the preparation of a polymer solution which comprises the steps of: mixing a polymer other than cellulose esters of lower fatty acids with a solvent to swell the polymer in the solvent; cooling the swelled mixture; and then warming the cooled mixture to dissolve the polymer in the solvent.

As is described in the item of the Background of the Invention, the cooling dissolution method has been proposed to dissolve cellulose acetate in acetone.

A lower fatty acid ester of cellulose such as cellulose acetate has a specific chemical structure, which is completely different from a synthetic polymer or other natural or semi-synthetic polymers such as gelatin. The lower fatty acid ester of cellulose is a specific semi-synthetic polymer, in which ester bonds combine lower fatty acids (having 1 to 6 carbon atoms) to free hydroxyl of glucose units polymerized with β1–4 glycoside bond. The cooling dissolution method is effective in dissolving cellulose acetate in acetone. The specific effect of the cooling dissolution method has been considered to depend on the specific chemical structure of cellulose acetate.

The applicants have studied the cooling dissolution method, and have surprisingly found that the cooling dissolution method is effective in dissolving a polymer other than cellulose esters of lower fatty acids in a solvent.

The cooling dissolution method can dissolve the polymer other than cellulose esters of lower fatty acids in the solvent, even if a conventional dissolution method does not dissolve the polymer in the solvent. Further, the cooling dissolution method can prepare an excellent polymer solution of a high concentration in which insoluble materials or gels are not observed, even if a conventional dissolution method does not prepare the polymer solution of the high concentration. Furthermore, the cooling dissolution method can form a stable polymer solution. Accordingly, the solution prepared by the cooling dissolution method can be further concentrated. A plastic material such as a plastic film is advantageously prepared by using a polymer solution of a high concentration because a solvent can quickly be removed from the a polymer solution of a high concentration.

DETAILED DESCRIPTION OF THE INVENTION

[Polymer and Solvent]

Figure 1:
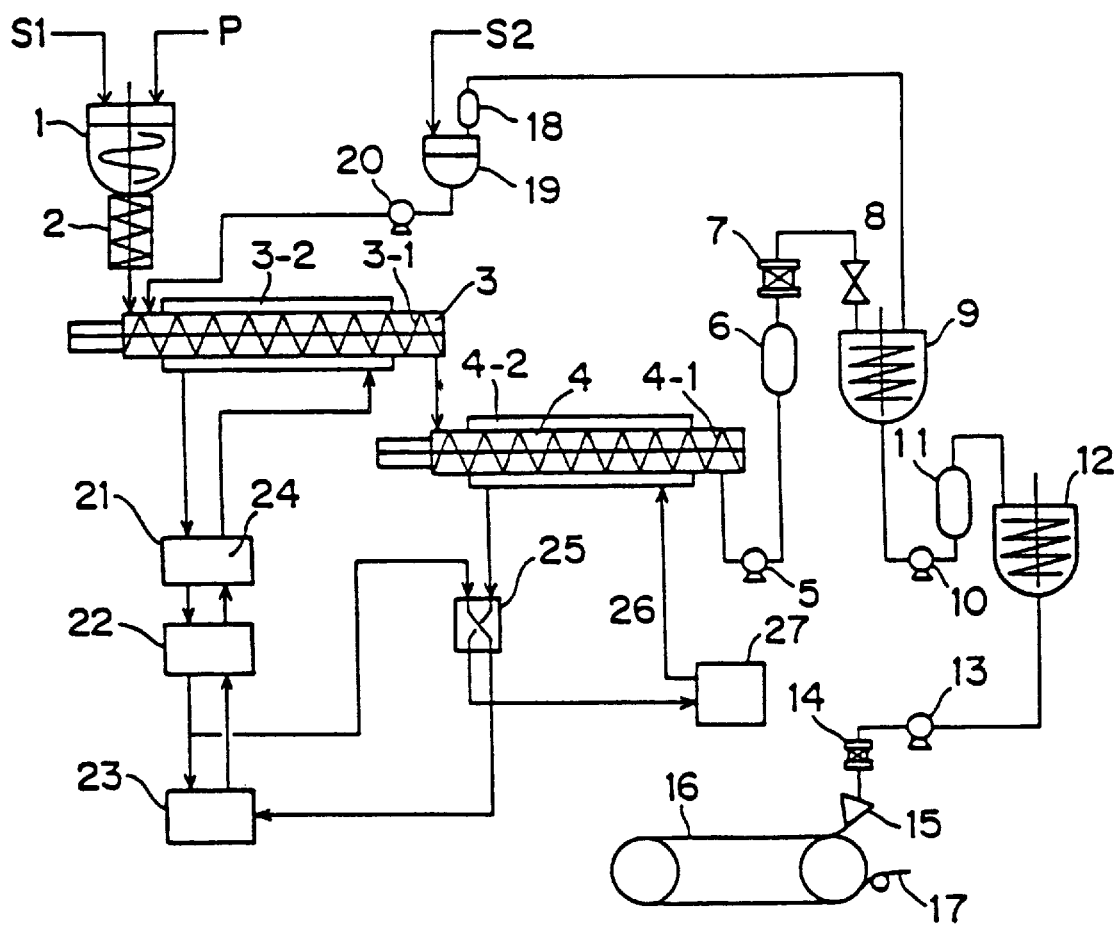
FIG. 1 is a flow chart schematically illustrating the process and apparatus of the first embodiment.

A combination of a polymer and a solvent is selected preferably on a condition that the polymer is swelled in the solvent at a temperature of 0 to 120° C., and preferably 0 to 55° C. (more preferably, a temperature at which the obtained solution will be used). If a polymer is not swelled in a solvent, it is substantially impossible to dissolve the polymer in the solvent even if a cooling dissolution method is used. Even though a polymer is dissolved in a solvent at room temperature, the present invention is effective because the process of the invention can dissolve the polymer in the solvent faster than a conventional dissolution method such as a method of stirring a mixture of the polymer and the solvent at a room temperature or an elevated temperature.

Examples of the polymers other than cellulose esters of lower fatty acids include polyolefins (e.g., a norbornene polymer), polyamides (e.g., aromatic polyamides), polysulfones, polyethers (including polyethersulfones and polyetherketones), polystyrenes, polycarbonates, polyacrylic polymers, polyacrylamides, polymethacrylic polymers (e.g., polymethyl methacrylate), polymethacrylamides, polyvinyl alcohols, polyureas, polyesters, polyimides, polyvinyl acetates, polyvinyl acetals (e.g., polyvinyl formals, polyvinyl butyrals) and proteins (e.g., gelatin).

In the present specification, the polyolefins mean polymers formed by an addition reaction of unsaturated monomers, which are essentially consisting of hydrocarbon. The polyamides mean polymers comprising repeating units combined by an amido bond (—NH—CO—). The polysulfones mean polymers comprising repeating units combined by a sulfonyl bond (—SO$_2$—). The polyethers mean polymers comprising repeating units combined by an ether bond (—O—). The polystyrenes mean polymers formed by an addition reaction of styrene or its derivatives (e.g., styrene having a substituted benzene ring). The polycarbonates mean polymers comprising repeating units combined by a carbonate bond (—O—CO—O—). The polyacrylic polymers mean polymers formed by an addition reaction of acrylic acid or its derivatives (e.g., acrylic esters). The polyacrylamides mean polymers formed by an addition reaction of acrylamide or its derivatives (e.g., N-substituted acrylamides). The polymethacrylic polymers mean polymers formed by an addition reaction of methacrylic acid or its derivatives (e.g., methacrylic esters). The polymethacrylamides mean polymers formed by an addition reaction of methacrylamide or its derivatives (e.g., N-substituted methacrylamides).

Further, the polyvinyl alcohols mean polymers formed by a saponification or a partial saponification reaction of polyvinyl acetate (described below) or their derivatives (e.g., acid modified polyvinyl alcohols). The polyureas mean polymers comprising repeating units combined by a urea bond (—NH—CO—NH—). The polyesters mean polymers comprising repeating units combined by an ester bond (—CO—O—). The polyurethanes mean polymers comprising repeating units combined by a urethane bond (—NH—CO—O—). The polyimides mean polymers comprising repeating units combined by an imido bond. The polyvinyl acetates mean polyvinyl acetate and its derivatives. The polyvinyl acetals mean polymers formed by a condensation (acetal) reaction of hydroxyl of polyvinyl alcohols (described above) with aldehyde. The proteins include natural proteins, denatured proteins and partially decomposed proteins.

The cooling dissolution method is effective in dissolving the above-mentioned polymers in a solvent.

In the present invention, an organic solvent is preferred to an inorganic solvent. Examples of the organic solvents include ketones (e.g., acetone, methyl ethyl ketone, cyclohexanone), esters (e.g., methyl formate, methyl acetate, ethyl acetate, amyl acetate, butyl acetate), ethers (e.g., dioxane, dioxolane, THF, diethyl ether, methyl t-butyl ether), hydrocarbons (e.g., benzene, toluene, xylene, hexane) and alcohols (e.g., methanol, ethanol).

A polymer is preferably swelled in a solvent, as is mentioned above. Accordingly, the solvent should be determined depending on the polymer. For example, preferred solvents of polycarbonates and polystyrenes include acetone and methyl acetate. Preferred solvents of polyolefins (e.g., a norbornene polymer) include benzene, toluene, xylene, hexane, acetone and methyl ethyl ketone. Preferred solvents of polyamides, polyacrylic polymers, polyacrylamides, polymethacrylic polymers (e.g., polymethyl methacrylate), polymethacrylamides, polysulfones and polyethers include acetone, methyl ethyl ketone, methyl acetate, butyl acetate and methanol. A preferred solvent of polyvinyl alcohols and proteins is water.

Two or more solvents can be used in combination. The characteristics of the prepared solution (such as viscosity) can be adjusted by using two or more solvents in combination.

The solvent has a boiling point preferably in the range of 20 to 300° C., more preferably in the range of 30 to 200° C., further preferably in the range of 40 to 100° C., and most preferably in the range of 50 to 800° C.

[Swelling Stage]

At the first stage, a polymer is mixed with a solvent to swell the polymer in the solvent.

The swelling stage is preferably conducted at a temperature of −10 to 55° C. The swelling stage is usually conducted at room temperature.

The ratio of the polymer to the mixture is determined depending on a concentration of a solution to be obtained. In the case that a solvent is supplied to the mixture at a cooling stage (described below), the amount of the solvent in the mixture should be determined by subtracting the amount of the supplemental solvent from the amount of the solvent in a solution to be obtained. The amount of the polymer in the solution to be obtained is preferably in the range of 5 to 30 wt. %, more preferably in the range of 8 to 20 wt. %, and most preferably in the range of 10 to 15 wt. %.

The mixture of the polymer and the solvent is preferably stirred to swell the polymer in the solvent. The stirring time is preferably in the range of 10 to 150 minutes, and more preferably in the range of 20 to 120 minutes.

At the swelling stage, other optional additives such as a plasticizer, a deterioration inhibitor, a dye and an ultraviolet absorbent can be added to the polymer and the solvent.

[Cooling Stage]

At the next stage, the swelled mixture is cooled. The swelled mixture preferably solidifies at the cooling stage. The cooling temperature is preferably in the range of the temperature of 5° C. higher than the freezing point of the solvent to the boiling point of the solvent (at atmospheric pressure), and more preferably in the range of the temperature of 10° C. higher than the freezing point to the temperature of 80° C. higher than the freezing point. Accordingly, the cooling temperature is preferably determined by the freezing point or the boiling point of the solvent. The cooling temperature is usually in the range of −100 to −10° C.

In the first embodiment of the cooling stage, the cooling rate is in the range of 1 to 40° C. per minute, preferably in the range of 2 to 40° C. per minute, more preferably in the range of 4 to 40° C. per minute, and most preferably in the range of 8 to 40° C. per minute.

In the second embodiment of the cooling stage, the cooling rate is faster than 40° C. per minute, preferably faster than 1° C. per second, more preferably faster than 2° C. per second, further preferably faster than 4° C. per second, and most preferably faster than 8° C. per second. The cooling rate is preferably fast as possible. However, a theoretical upper limit of the cooling rate is 10,000° C. per second, a technical upper limit is 1,000° C. per second, and a practical upper limit is 100° C. per second.

The cooling rate means the change of temperature at the cooling stage per the time taken to complete the cooling stage. The change of temperature means the difference between the temperature at which the cooling stage is started and the temperature at which the cooling stage is completed.

According to the first embodiment of the cooling stage, the swelled mixture is preferably cooled by incorporating the mixture into a cylinder to which a cooling mean is attached, and stirring and conveying the mixture in the cylinder. The swelled mixture can be cooled quickly according to the first embodiment.

Further, the swelled mixture can also be cooled by further mixing the mixture with a supplemental solvent precooled at a temperature of −105 to −15° C. The supplemental solvent is precooled preferably at a temperature of −100 to −25° C., more preferably at a temperature of −95 to −35° C., and most preferably at a temperature of −85 to −55° C.

The time taken to complete the cooling stage (the time taken to cool the mixture and to keep the mixture at the cooling temperature) is preferably in the range of 10 to 300 minutes, and more preferably in the range of 20 to 200 minutes.

The cylinder used in the first embodiment is preferably sealed to prevent contamination of water, which may be caused by dew condensation at the cooling stage. Further, the time taken to complete the cooling stage can be shortened by conducting the cooling procedures under a reduced pressure. A cylinder resisting pressure is preferably used to conduct the procedures under a reduced pressure.

The first embodiment of the cooling stage can be conducted in a closed system. The closed system has an advantage (compared with an open system such as the second embodiment) that amounts of components used in the system directly reflect the composition (particularly concentration) of a solution to be obtained. Accordingly, the amounts of components can be theoretically determined from the composition of the solution to be obtained. On the other hand, the amounts of components should empirically be determined from experimental results if the solution is prepared in an open system.

According to the second embodiment, the swelled mixture is cooled by extruding the mixture into a liquid precooled at a temperature of −100 to −10° C. The extruded mixture is in the form of fiber having a diameter in the range of 0.1 to 20.0 mm or in the form of membrane having a thickness in the range of 0.1 to 20.0 mm. The diameter or the thickness is preferably in the range of 0.2 to 10.0 mm. The cooling rate is inversely proportional to the square of the diameter. If a thermal conductivity of a fibrous swelled mixture is 0.2 kcal/mhr° C. and a temperature of a liquid is −50° C., the relation between the time taken to cool the center of the fiber from room temperature to −45° C. (T. second) and the diameter of the fiber (D, mm) can be represented by a formula, $T=D^2$. If the diameter is 1 mm, the cooling time is 1 second, which means the cooling rate of 70° C. per second. If the diameter is 10 mm, the cooling time is 100 second, which means the cooling rate of 42° C. per minute. The relation between the cooling time and the thickness of the membrane of the swelled mixture is the same as the relation between the cooling time and the diameter of the fiber.

The fiber or the membrane of the swelled mixture can be continuous (have an unlimited length) or can be cut into pieces having a certain length. The cross sectional profile of the fibrous mixture is determined preferably to improve efficiency of heat transfer. Accordingly, a starlike shape is preferred to a circular shape because a fiber having a star-like cross sectional profile has a large surface area, which is effective for heat transfer.

The extrusion of the swelled mixture can be conducted by applying pressure (including gravity) to the mixture placed on a board having many small holes or slits whereby the mixture passes through the holes or slits. The formed fibers or membranes are immersed in (usually dropped into) a precooled liquid.

There is no specific limitation with respect to the liquid for cooling the mixture (except that it must be in the form of liquid at the cooling temperature). The solvent contained in the mixture can also be used as the liquid. Since the second embodiment is an open system, the liquid may be incorporated into the mixture. If the solvent of the mixture is used as the liquid, the composition of the obtained polymer solution could be analogous to the composition of the mixture. Alternatively, a polymer solution can contain a liquid or a substance contained in the liquid as a minor component by incorporating the liquid or the substance into the mixture.

According to the second embodiment, the swelled solvent can be cooled in a short time, for example several seconds. The mixture can be held at the cooling temperature. The cooling time corresponds to the time for which the mixture passes through the precooled liquid. If the liquid flows in a vessel, the cooling time can be adjusted by controlling the flow rate.

The vessel used in the second embodiment is preferably sealed to prevent contamination of water, which may be caused by dew condensation at the cooling stage. Further, the time taken to complete the cooling stage can be shortened by conducting the cooling procedures under a reduced pressure. A vessel resisting pressure is preferably used to conduct the procedures under a reduced pressure.

The cooling stage of the third embodiment can be conducted in the same manner as in the first embodiment or the second embodiment.

[Separating Stage]

After the second embodiment of the cooling stage, the extruded mixture is preferably separated from the precooled liquid after cooling the swelled mixture and before warming the cooled mixture. The fiber or membrane of the mixture separated from the liquid can be effectively warmed at the next warming stage.

The extruded mixture usually solidifies at the cooling stage. It is easy to separate a solid fiber or membrane from a liquid. For example, a solid fiber or membrane in a liquid can be taken out in a net. A board having small holes or slits can be used in place of the net. The net or the board is made of a plastic or metal that is not dissolved in a precooled liquid. The mesh of the net, the diameter of the hole or the width of the slit should be adjusted to the diameter of the fiber or the thickness of the membrane to prevent the fiber or membrane from passing through the net or the board. Further, a conveyer can separate the fiber or membrane from the liquid. The conveyer transports the fiber or membrane from a cooling device to a warming device. The conveyer can be made of a net to separate the fiber or membrane from the liquid effectively.

[Warming Stage]

According to the first and second embodiment, the cooled mixture is warmed to a temperature of 0 to 120° C., and preferably to a temperature of 0 to 55° C. According to the third embodiment, the cooled mixture is warmed to a temperature of 0 to 200° C. The temperature of the obtained solution after the warming stage usually is room temperature.

In the first embodiment of the warming stage, the warming rate is in the range of 1 to 40° C. per minute, preferably in the range of 2 to 40° C. per minute, more preferably in the range of 4 to 40° C. per minute, and most preferably in the range of 8 to 40° C. per minute.

In the second embodiment of the warming stage, the warming rate is faster than 40° C. per minute, preferably faster than 1° C. per second, more preferably faster than 2° C. per second, further preferably faster than 4° C. per second, and most preferably faster than 8° C. per second.

In the third embodiment of the warming stage, the warming rate is faster than 1° C. per minute, preferably faster than 2° C. per minute, more preferably faster than 4° C. per minute, and most preferably faster than 8° C. per minute.

The warming rate is preferably fast as possible. However, a theoretical upper limit of the warming rate is 10,000° C. per second, a technical upper limit is 1,000° C. per second, and a practical upper limit is 100° C. per second.

The warming rate means the change of temperature at the warming stage per the time taken to complete the warming stage. The change of temperature means the difference between the temperature at which the warming stage is started and the temperature at which the warming stage is completed.

According to the first embodiment of the warming stage, the cooled mixture is preferably warmed by incorporating the mixture into a cylinder to which a warming mean is attached, and stirring and conveying the mixture in the cylinder. The cooled mixture can be warmed quickly according to the first embodiment.

The time taken to complete the warming stage (the time taken to warm the mixture and to keep the mixture at the warming temperature) is preferably in the range of 10 to 300 minutes, and more preferably in the range of 20 to 200 minutes.

The time taken to complete the warming stage can be shortened by conducting the warming procedures under a high pressure. A cylinder resisting pressure is preferably used to conduct the procedures under a high pressure.

The first embodiment of the warming stage can be conducted in a closed system. The closed system has an advantage (compared with an open system such as the second embodiment), as is described about the cooling stage.

According to the second embodiment, the cooled mixture is warmed by immersing the mixture in a liquid prewarmed at a temperature of 0 to 120° C. The mixture is in the form of fiber having a diameter in the range of 0.1 to 20.0 mm or in the form of membrane having a thickness in the range of 0.1 to 20.0 mm. The diameter or the thickness is preferably in the range of 0.2 to 10.0 mm. The relation between the warming time and the diameter of the fiber or the thickness of the membrane is analogous to the relation described about the cooling stage.

If a mixture is extruded in the form of a fiber or membrane at the cooling stage by the second embodiment, the cooled fiber or membrane is immersed in a prewarmed liquid at the warming stage. If the cooling stage is conducted by procedures other than the second embodiment, a cooled mixture is extruded in the form of a fiber or membrane, and dropped into a prewarmed liquid. The mixture can be extruded in the same manner as is described about the second embodiment of the cooling stage.

There is no specific limitation with respect to the liquid for warming the mixture (except that it must be in the form of liquid at the warming temperature). The solvent contained in the mixture can also be used as the liquid. If the process is successively conducted, the prepared polymer solution can be used as the prewarmed liquid. For example, the fiber or membrane of the mixture is dropped into the prepared solution in a vessel to warm the fiber or membrane quickly and to change it into the solution, whereby the amount of the solution is increased. The increased amount of the solution is recovered from the vessel.

According to the second embodiment, the cooled mixture can be warmed in a short time, for example several seconds.

The time taken to complete the warming stage can be shortened by conducting the warming procedures under a reduced pressure. A pressure-resistant vessel is preferably used to conduct the procedures under a reduced pressure.

According to the third embodiment, the cooled mixture is warmed at a temperature of higher than the boiling point of the solvent under a controlled pressure of preventing the solvent from boiling.

The warming temperature of the third embodiment is determined according to the boiling point of the solvent. Since preferred solvents have a boiling point in the range of 50 to 80° C. (e.g., methyl acetate: 57.5° C., acetone: 56.5° C.), the warming temperature is usually in the range of 60 to 200° C. The warming temperature is preferably in the range of 70 to 180° C., more preferably in the range of 80 to 160° C., further preferably in the range of 90 to 150° C., and most preferably in the range of 100 to 140° C.

The pressure is higher than 1 atmospheric pressure (=1, 0332 kgw/cm$^2$) to prevent the solvent from boiling. The pressure is determined by the relation between the boiling point of the solvent and the warming temperature. The pressure is usually in the range of 1.2 to 20 kgw/cm$^2$, preferably in the range of 1.5 to 18 kgw/cm$^2$, more preferably in the range of 2 to 16 kgw/cm$^2$, further preferably in the range of 3 to 14 kgw/cm$^2$, and most preferably in the range of 4 to 12 kgw/cm$^2$.

The warming stage of the third embodiment can easily be conducted in a pressure-resistant sealed vessel. Where the mixture is warmed in the pressure-resistant sealed vessel, the solvent is gradually evaporated to increase the pressure i the vessel. Accordingly, the solvent is not boiled in the vessel, even though the temperature is higher than the boiling point of the solvent. The pressure is increased with increasing the temperature. Therefore, the pressure in the vessel is automatically adjusted to prevent the solvent from boiling. Further, a means for adjusting the pressure can be attached to a pressure-resistant vessel. For example, the pressure in the vessel can be increased by injecting a relatively inactive gas (such as nitrogen gas) into the vessel.

The mixture may be preheated by a heater in the case that a warming apparatus cannot warm the mixture at a sufficient warming rate.

After the warming stage, a polymer solution is obtained. If a polymer is not completely dissolved in a solvent, the procedures from the cooling stage to the warming stage can be repeated twice or more times. It can be determined by observation whether a polymer is completely dissolved in a solvent or not.

[Post Treatment]

The prepared polymer solution can be subjected to post treatment such as adjustment of concentration (or dilution), filtration, adjustment of temperature or addition of components.

In the case that the solution is prepared by the third embodiment, the solution under a high pressure can easily be concentrated according to a flash concentration method. In the flash concentration method, the solvent is evaporated by reducing the high pressure to the atmospheric pressure immediately.

The additional components are determined according to use of the polymer solution. Examples of the representative additives include a plasticizer, a deterioration inhibitor (e.g., a peroxide decomposer, a radical inhibitor, a metal inactivator, an acid scavenger), a dye and an ultraviolet absorbent.

The obtained polymer solution should be stored at a temperature within a certain range to keep the state of the solution. The obtained polymer solution can be used to form various polymer materials.

[Preparation of Polymer Film]

A polymer film can be formed by a solvent cast method using the obtained polymer solution.

The polymer solution is cast on a support, and the solvent is evaporated to form a film. Before casting the solution, the concentration of the solution is preferably so adjusted that the solid content of the solution is in the range of 18 to 35 wt. %. The surface of the support is preferably polished to give a mirror plane. A drum or a band is used as the support. The casting and drying stages of the solvent cast methods are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

[Apparatus]

The apparatus of the present invention is described below referring to the drawings.

The first embodiment of the apparatus comprises a stirring device, a cooling device connected to the stirring device, and a warming device connected to the cooling device, wherein both of the cooling device and the warming device include a rotary screw.

The stirring device preferably comprises a first vessel and a stirring means contained in the first vessel. The cooling preferably comprising a second vessel (more preferably in the form of a cylinder) connected to the first vessel, a rotary screw contained in the second vessel and a cooling means attached to the second vessel. The warming device preferably comprises a third vessel (more preferably in the form of a cylinder) connected to the second vessel, a rotary screw contained in the third vessel and a warming means attached to the third vessel.

FIG. 1 is a flow chart schematically illustrating the process and apparatus of the first embodiment.

As is shown in FIG. 1, a polymer (P) and a solvent (S1) are introduced into a stirring tank (1) at the swelling stage. The polymer and the solvent are mixed in the tank to swell the polymer with the solvent.

The swelled mixture is sent to a cooling device (3) by a liquid pump (2). The liquid pump (2) preferably is a snake pump, which is advantageously used to send a viscous liquid.

The cooling device (3) comprises a cylinder connected to the stirring tank (1) through the liquid pump (2), a rotary screw (3-1) contained in the cylinder and a cooling means (3-2) attached to the cylinder. The screw (3-1) rotates in the cylinder to send the swelled mixture while shearing, mixing and cooling the mixture. The mixture cannot stay in the cylinder because the screw (3-1) scrapes the mixture from the inner wall of the cylinder. The cooling means (3-2) shown in FIG. 1 is in the form of a jacket of the cylinder. A refrigerant (24) flows in the jacket. The refrigerant is sent from a refrigerant tank (21). An example of the refrigerant is a mixture of methanol and water. In place of rotating the screw, the screw can be fixed, and the mixture can be sent through the screw in the cylinder by pressure.

After cooling the swelled mixture, the refrigerant returns to the cooling tank (21). The medium is cooled in a refrigerator (22). A cooling tower (23) processes heat formed in the refrigerator.

The cooling device (3) has a means for supplying a solvent precooled at −105 to −15° C. A supplemental solvent (S2) is precooled in a cooling stock tank (19) and sent to the cylinder of the cooling device (3) by a liquid pump (20). The swelled mixture is cooled more quickly by supplying the precooled solvent (S2) to the mixture.

The cooling device (3) is described below in more detail referring to FIG. 2.

The swelled mixture is quickly and uniformly cooled to −100 to −10° C. in the cooling device. The cooled mixture is sent to a warming device (4).

The warming device (4) is similar to the cooling device (3). The warming device (4) comprises a cylinder connected to the cooling device (3), a rotary screw (4-1) contained in the cylinder and a warming means (4-2) attached to the cylinder. The screw (4-1) rotates in the cylinder to send the cooled mixture while shearing, mixing and warming the mixture. The mixture cannot stay in the cylinder because the screw (4-1) scrapes the mixture from the inner wall of the cylinder. The warming means (4-2) shown in FIG. 1 is in the form of a jacket of the cylinder. A heating medium (26) flows in the warming means (4-2). The heating medium is sent from a constant temperature bath (27). An example of the heating medium is hot water. In place of rotating the screw, the screw can be fixed, and the mixture can be sent through the screw in the cylinder by pressure.

A prewarmed solvent may be supplied to the cooled mixture in the same manner as in the cooling device. However, the supplement of the prewarmed solvent is not effective. The solvent lacks thermal efficiency. Heat formed by rotation of the screw in the warming device as well as the heating medium (26) warms the cooled mixture.

After warming the cooled mixture, the heating medium and water sent from the cooling tower (23) exchange heat in a heat exchanger (25). The thermal efficiency of the apparatus is improved by the heat exchange. After the heat exchange, the heating medium returns to the constant temperature bath (27).

The cooled mixture is quickly and uniformly warmed in the warming device to dissolve a polymer in a solvent. The obtained solution is sent to a heater (6), a filter (7) and a pressure adjusting valve (8) in the order by a liquid pump to adjust temperature, to conduct filtration and to adjust pressure.

The solution is concentrated in a concentration tank (9). The solution, which has been conditioned to a high temperature and a high pressure by the heater (6) and the pressure adjusting valve (8) is introduced into the concentration tank (9) under a reduced pressure. Accordingly, the solvent of the solution is immediately evaporated under the reduced pressure. The evaporated solvent is sent to a liquefying device (18) and to the cooling stock tank (19). The liquefied solvent mixed with the supplemental solvent (S2) is again sent to the cylinder of the cooling device (3) by the pump (20).

The concentrated solution is sent to a thermal controller (11) and to a stock tank (12) by a liquid pump (10).

A device of the preparation of a polymer film according to a solvent casting method is further attached to the apparatus shown in FIG. 1.

The solution in the stock tank (12) is sent to a filter (14) and to a slit die (15) by a liquid pump (13). The solution is extruded by the die, and cast on a band support (16). The cast solution is dried and peeled from the support to form a film (17). The film (17) is further dried and wound up to a roll.

Figure 2:
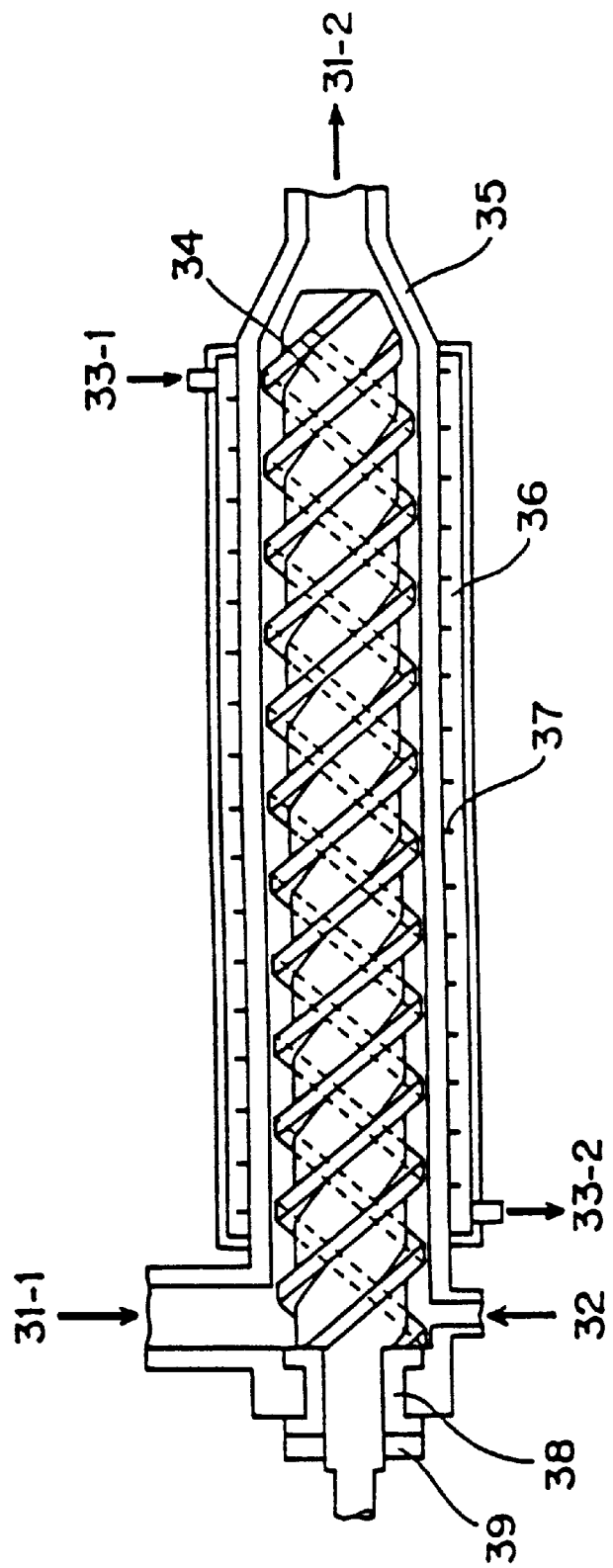
FIG. 2 is a sectional view schematically illustrating the cooling device of the first embodiment.

FIG. 2 is a sectional view schematically illustrating the cooling device (3 in FIG. 1) of the first embodiment.

A swelled mixture of a polymer and a solvent is introduced into a cylinder (35) at an inlet (31-1). A cooled mixture is sent to a warming device from an outlet (31-2).

The cylinder further has an inlet of a precooled supplemental solvent (32), an inlet (33-1) of a refrigerant and an outlet (33-2) of the refrigerant.

In the cylinder, a screw rotates around the center of a shaft (34). The screw sends the swelled mixture from the inlet (31-1) to the outlet (31-2) while shearing, mixing and cooling the mixture. The mixture cannot stay in the cylinder because the screw scrapes the mixture from the inner wall of the cylinder (35).

Spiral turbulent flow fins are attached inside a cooling means (36) in the form of a jacket, in other words outside the cylinder (35). The fins have a function of improving the cooling efficiency of a refrigerant.

The screw shaft (34) is rotated by a motor (not shown) placed outside the cylinder (35). The inside of the cylinder (35) is under a high pressure. Accordingly, the connection of the cylinder (35) to the shaft (34) is sealed with a sealing compound (38) and a seal stopper (39).

The warming device (4 in FIG. 1) can be analogous to the cooling device shown in FIG. 2, except that the inlet of the supplemental solvent (32) is not necessary.

The second embodiment of the apparatus comprises a stirring device, an extrusion device connected to the stirring device, a cooling device connected to the extrusion device and warming device connected to the cooling device, wherein the extrusion device is a fiber or membrane extruding die, and both of the cooling device and the warming device mainly consist of a vessel.

The stirring device preferably comprises a first vessel and a stirring means contained in the first vessel (41). The cooling device preferably comprises a second vessel placed under the extruding device and a cooling means attached to the second vessel (58). The second embodiment preferably further comprises a separating device between the cooling device and the warming device. The separating device preferably comprises a conveyer, a part of which is placed inside the second vessel and under the extruding device, and the other part of which is placed outside the second vessel. The warming device preferably comprises a third vessel (45) placed under the part of the conveyer outside the second vessel and a warming means attached to the third vessel.

Figure 3:
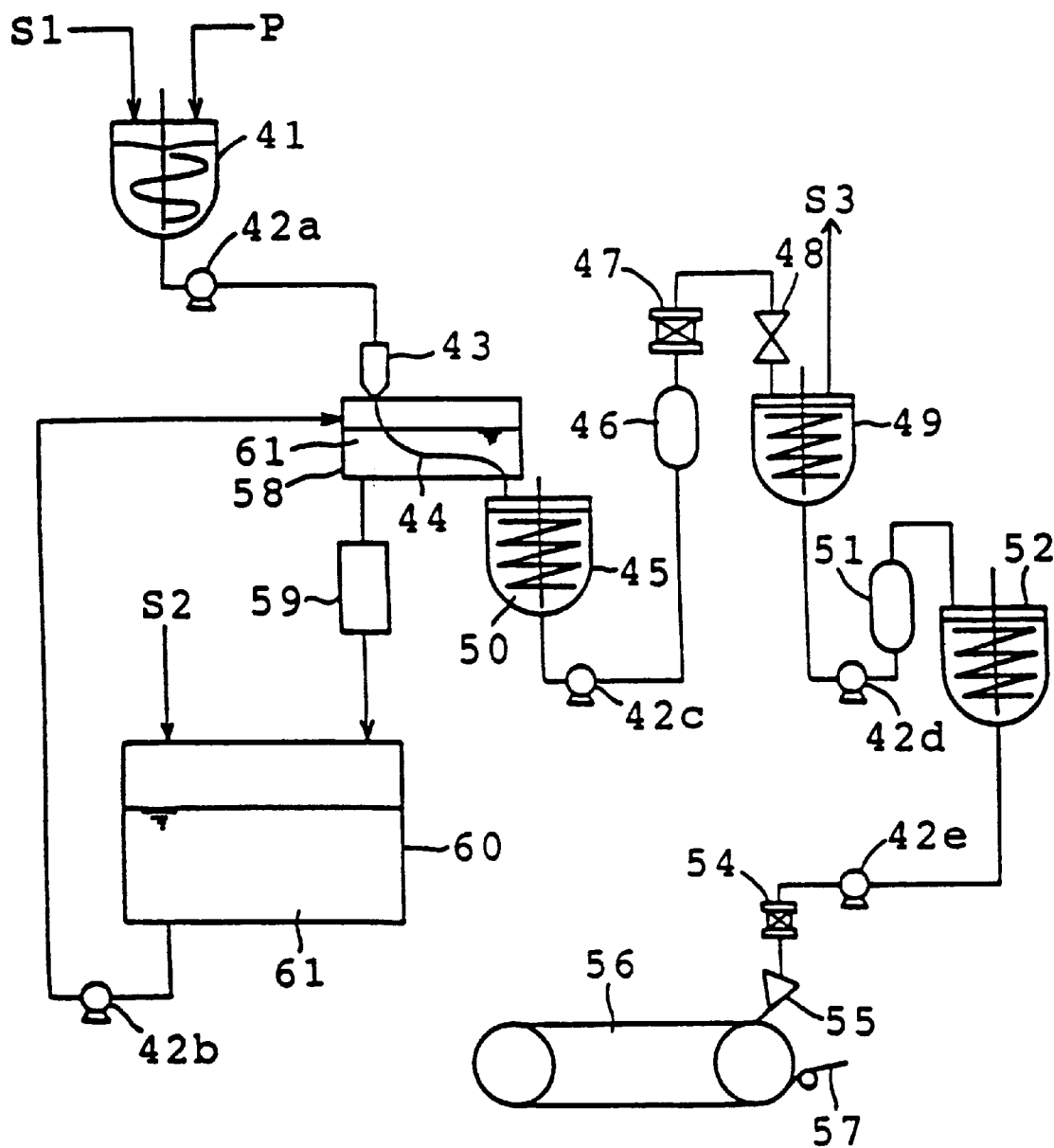
FIG. 3 is a flow chart schematically illustrating the process and apparatus of the second embodiment.

FIG. 3 is a flow chart schematically illustrating the process and apparatus of the second embodiment.

As is shown in FIG. 3, a polymer (P) and a solvent (S1) are introduced into a stirring vessel (41) at the swelling stage. The polymer and the solvent are mixed in the vessel (41) to swell the polymer with the solvent.

The swelled mixture is sent to a fiber extruding die (43) by a liquid pump (42a). The liquid pump (42a) preferably is a snake pump, which is advantageously used to send a viscous liquid.

The die (43) extrudes the swelled mixture in the form of a fiber. The fibrous swelled mixture (44) is dropped into a cooling and separating vessel (58). The dropped fiber is immediately cooled with a cooling liquid (61) in the vessel (58).

After cooling the swelled mixture, the refrigerant returns to the cooling liquid tank (60) through a filter (59). A supplemental cooling liquid (S2) is added to the returned cooling liquid (61), and the mixed cooling liquid is cooled in the tank (60). The cooling liquid is sent from the tank (60) to the cooling and separating vessel (58) by a pump (42b).

The cooled fibrous mixture (44) is separated from the cooling liquid (61) and sent to a warming vessel (45).

Means for warming and stirring the fibrous mixture (44) are attached to the warming vessel (45). The vessel (45) contains a prepared polymer solution (50) formed by warming the fibrous cooled mixture. The polymer solution (50) functions as a warming liquid. The fibrous cooled mixture dropped into the warming vessel (45) is immediately warmed with the polymer solution (50) to dissolve the polymer in the solvent.

As a result, the amount of the polymer solution (45) in the warming vessel (45) is increased. The extra amount of the solution is sent from the warming vessel (45) to a liquid pump (42c). The solution is further sent to a heater (46), a filter (47) and a pressure adjusting valve (48) in the order to adjust temperature, to conduct filtration and to adjust pressure.

The solution is concentrated in a concentration tank (49). The solution, which has been conditioned to a high pressure by the pressure adjusting valve (48) is introduced into the concentration tank (49) under a reduced pressure. Accordingly, the solvent of the solution is immediately evaporated under the reduced pressure. The solution is further heated and stirred in the concentration tank. The evaporated solvent (S3) is recovered and reused as the solvent (S1).

The concentrated solution is sent to a thermal controller (51) and to a stock tank (52) by a liquid pump (42d).

A device of the preparation of a polymer film according to a solvent casting method is further attached to the apparatus shown in FIG. 3.

The solution in the stock tank (52) is sent to a filter (54) and to a slit die (55) by a liquid pump (42e). The solution is extruded by the die, and cast on a band support (56). The cast solution is dried and peeled from the support to form a film (57). The film (57) is further dried and wound up to a roll.

Figure 4:
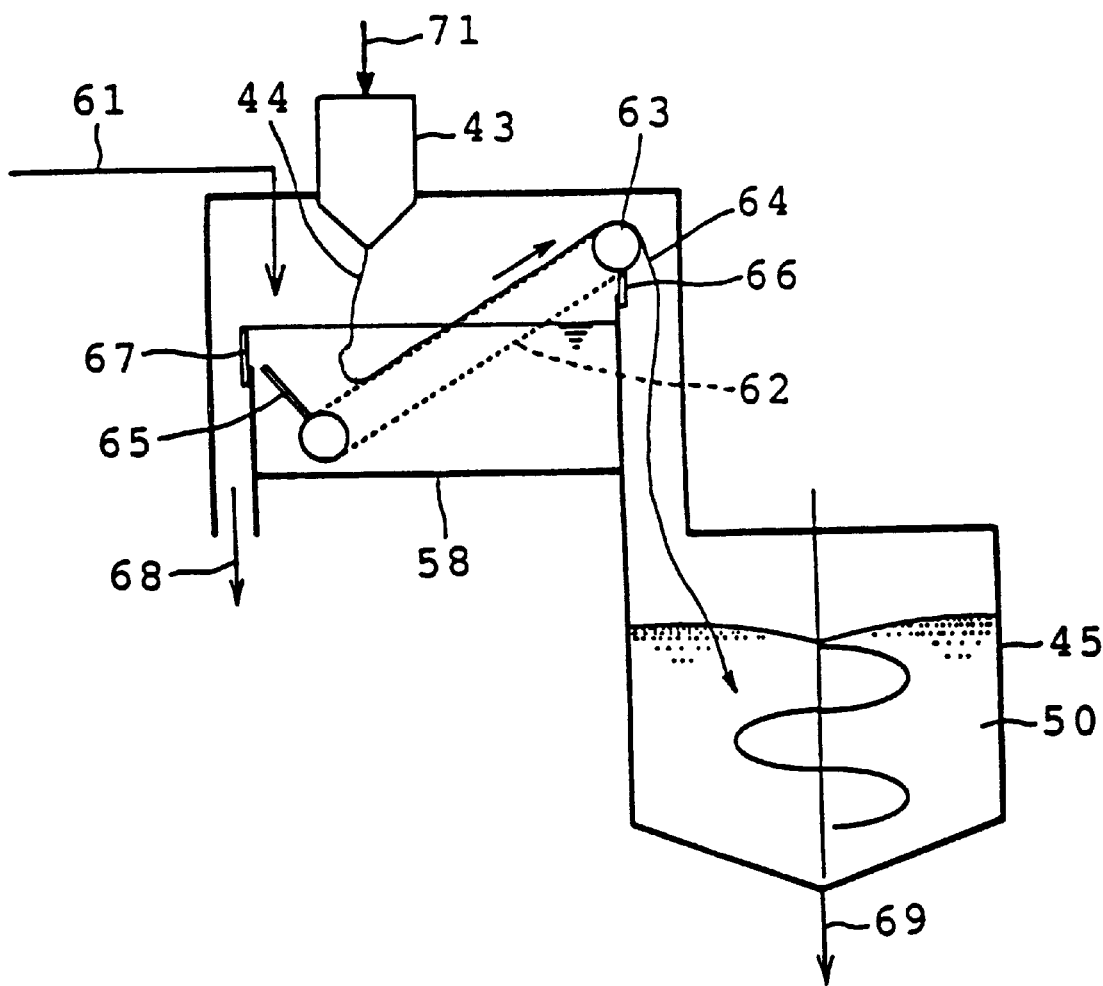
FIG. 4 is a sectional view schematically illustrating the apparatus of the second embodiment.

FIG. 4 is a sectional view schematically illustrating the apparatus of the second embodiment (3 to 5 shown in FIG. 3).

A swelled mixture of a polymer and a solvent (71) is extruded by a fiber extruding die (43). The extruded fiber (44) of the mixture is dropped into a cooling and separating vessel (58). FIGS. 3 and 4 show only one fiber (44) for convenience of description. However, it is possible and preferred to extrude many fibers simultaneously by using an extruding die.

The cooling and separating vessel (58) contains a cooling liquid (61). Further, a slanted conveyer belt made of a net (22) is placed in the cooling and separating vessel (58), except that the end of the belt is placed outside the vessel. The conveyer belt is rotated by a driving roller (63).

The dropped fiber of the mixture (44) is immediately cooled with the cooling liquid (61) in the vessel (58). The cooled fiber (64) is separated from the cooling liquid (61) while conveying the fiber on the belt (62). The separated fiber (64) is dropped into a warming vessel (45). A guide board (65) and a scraper (66) are attached to the conveyer belt (62). The board (65) guides the dropped fiber (44) to the conveyer belt (62). The scraper (66) scarps the fiber adhered to the conveyer belt (62).

An adjusting board (67) is attached to the cooling and separating vessel (58). The board (67) can adjust the liquid level in the vessel (58) to control the time for which the dropped fiber (44) is immersed in the cooling liquid (61). A cooling liquid (68) flowing over the board (67) is filtered by a filter (59 in FIG. 3) and cooled in a cooling liquid tank (60 in FIG. 3), and is reused as the cooling liquid (61).

The warming vessel (45) contains a prepared polymer solution (50). The polymer solution is warmed and stirred in the vessel (45). The cooled fiber (64) dropped into the vessel (45) is immediately warmed to dissolve the polymer in the solvent. An extra amount of the prepared solution (69) is sent from the warming vessel (45) to a liquid pump (42c in FIG. 3).

Figure 5:
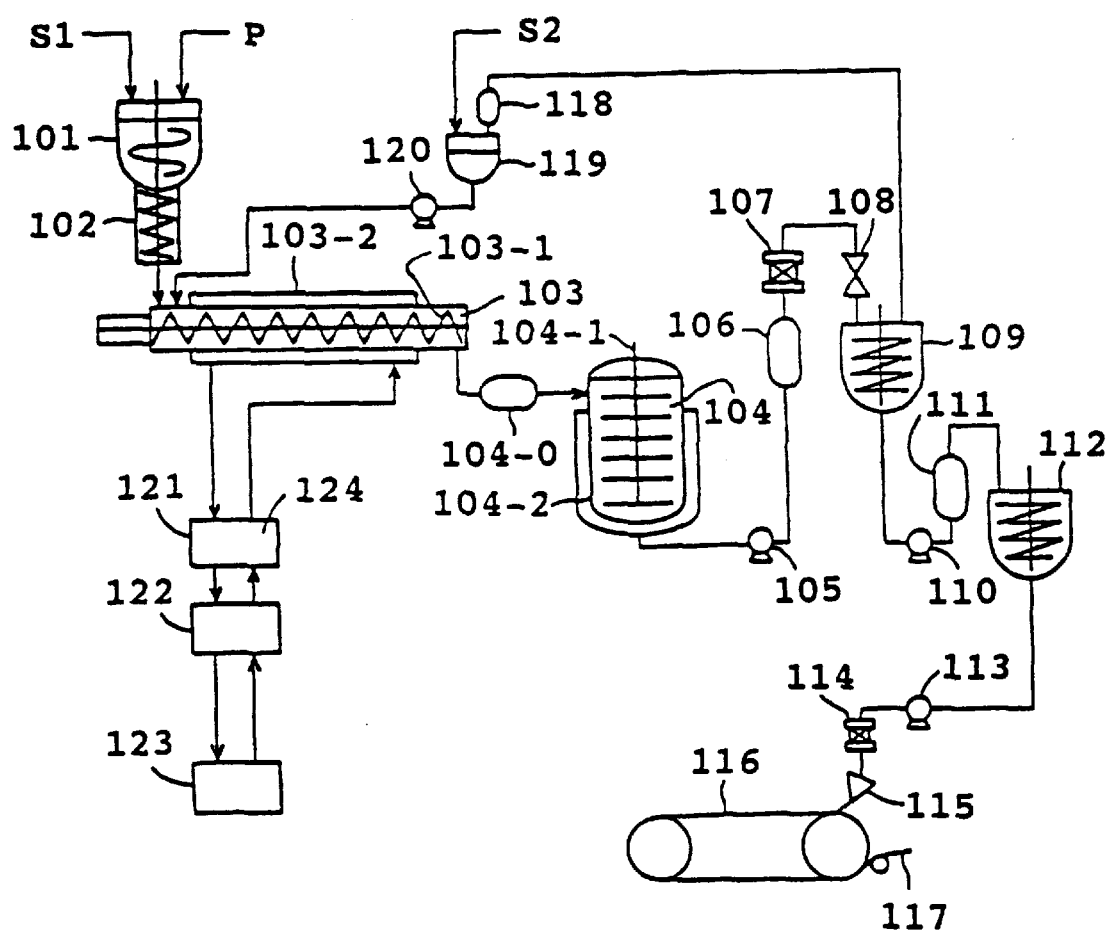
FIG. 5 is a flow chart schematically illustrating the process and apparatus of the third embodiment.

FIG. 5 is a flow chart schematically illustrating the process and apparatus of the third embodiment.

As is shown in FIG. 5, a polymer (P) and a solvent (S1) are introduced into a stirring tank (101) at the swelling stage. The polymer and the solvent are mixed in the tank to swell the polymer with the solvent.

The swelled mixture is sent to a cooling device (103) by a liquid pump (102a). The liquid pump (102a) preferably is a snake pump, which is advantageously used to send a viscous liquid.

The cooling device (103) comprises a cylinder connected to the stirring tank (101) through the liquid pump (102), a rotary screw (103-1) contained in the cylinder and a cooling means (103-2) attached to the cylinder. The screw (103-1) rotates in the cylinder to send the swelled mixture while shearing, mixing and cooling the mixture. The mixture cannot stay in the cylinder because the screw (103-1) scrapes the mixture from the inner wall of the cylinder. The cooling means (103-2) shown in FIG. 5 is in the form of a jacket of the cylinder. A refrigerant (124) flows in the jacket. The refrigerant is sent from a refrigerant tank (121). An example of the refrigerant is a mixture of methanol and water. In place of rotating the screw, the screw can be fixed, and the mixture can be sent through the screw in the cylinder by pressure.

After cooling the swelled mixture, the refrigerant returns to the cooling tank (121). The medium is cooled in a refrigerator (122). A cooling tower (123) processes heat formed in the refrigerator.

The cooling device (103) has a means for supplying a solvent. A supplemental solvent (S2) is precooled in a cooling stock tank (119) and sent to the cylinder of the cooling device (103) by a liquid pump (120). The swelled mixture is cooled more quickly by supplying the precooled solvent (S2) to the mixture.

The swelled mixture is quickly and uniformly cooled in the cooling device. The cooled mixture is sent to a warming device (104).

The warming device (104) comprises a sealed pressure-resistant vessel. A heater (104-0) is placed before the warming device to preheat the mixture. A stirring means (4-1) is placed in the vessel. A heating means in the form of a jacket (104-2) is attached to the vessel. When a mixture is stirred in the warming device (104) while heating, the solvent is gradually evaporated to increase the pressure in the vessel. Accordingly, the solvent is not boiled, even if the mixture is heated at a temperature of higher than the boiling point of the solvent.

The warming device (104) is described below in more detail referring to FIG. 6.

The cooled mixture is quickly and uniformly warmed in the warming device to dissolve a polymer in a solvent. The obtained solution is sent by a liquid pump (105) to a heater (106), a filter (107) and a pressure adjusting valve (108) in the order to adjust temperature, to conduct filtration and to adjust pressure.

The solution is concentrated in a concentration tank (109). The solution, which has been conditioned to a high temperature and a high pressure by the heater (106) and the pressure adjusting valve (108) is introduced into the concentration tank (109) under a reduced pressure. Accordingly, the solvent of the solution is immediately evaporated under the reduced pressure. The evaporated solvent is sent to a liquefying device (118) and to the cooling stock tank (119). The liquefied solvent mixed with the supplemental solvent (S2) is again sent to the cylinder of the cooling device (103) by the pump (120).

The concentrated solution is sent to a thermal controller (111) and to a stock tank (112) by a liquid pump (110).

A device of the preparation of a polymer film according to a solvent casting method is further attached to the apparatus shown in FIG. 5.

The solution in the stock tank (112) is sent to a filter (114) and to a slit die (115) by a liquid pump (113). The solution is extruded by the die, and cast on a band support (116). The cast solution is dried and peeled from the support to form a film (117). The film (117) is further dried and wound up to a roll.

Figure 6:
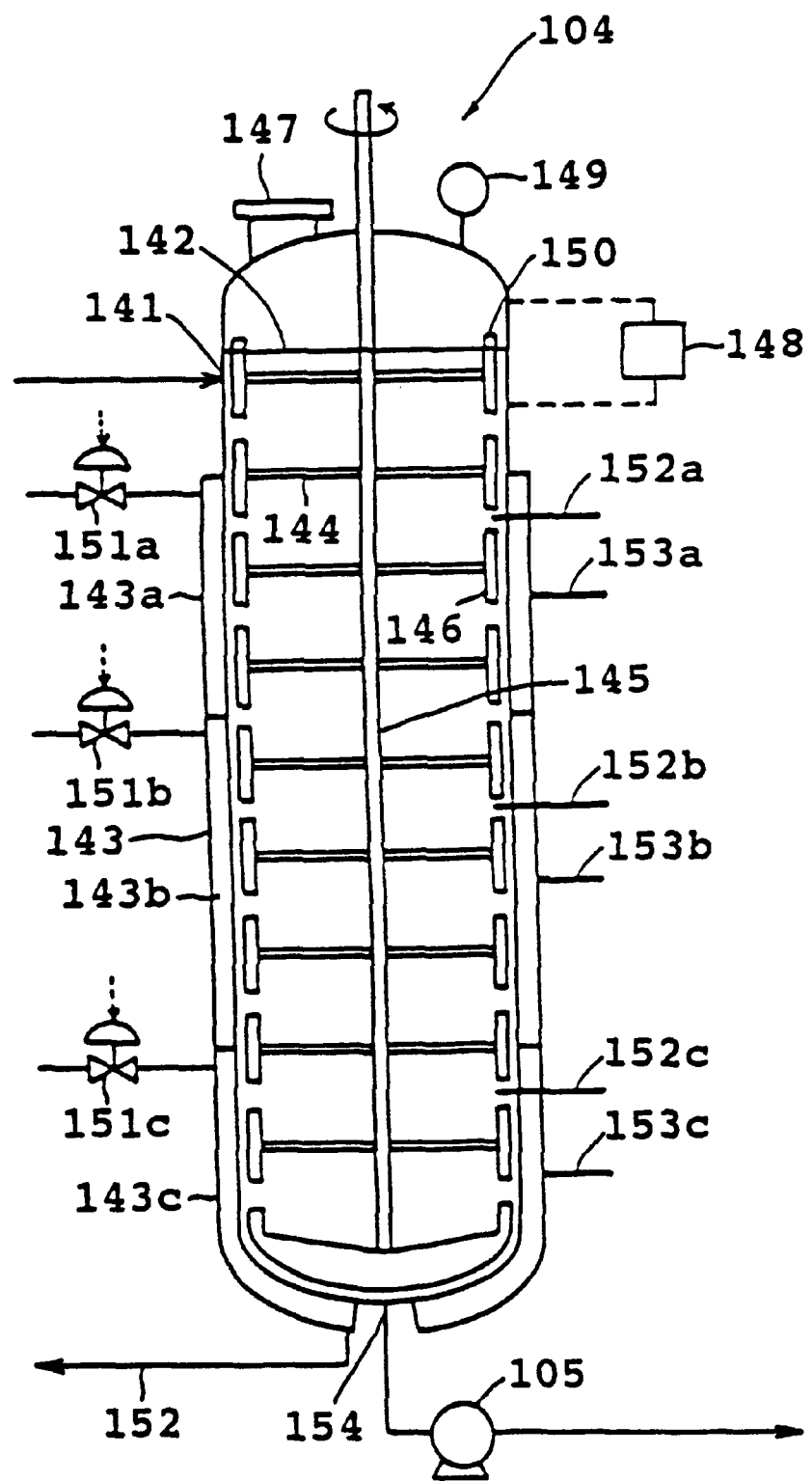
FIG. 6 is a sectional view schematically illustrating the warming device of the third embodiment.

FIG. 6 is a sectional view schematically illustrating the warming device (104 in FIG. 5) of the third embodiment.

The pressure-resistant long vessel (104) has an inlet (141). The cooled mixture is introduced into the vessel (104) through the inlet (141). The inlet (141) is placed under a liquid surface (142) and above a steam jacket (143) for heating the mixture. A stirring axis (145) having many stirring wings (144) is centered in the vessel (104). The stirring wing (144) is made of a flat disc. The length of the wing is slightly shorter than the internal diameter of the vessel. Holes can be made in the flat disc. Scratching wings (146) are attached to both ends of the stirring wing (144). The stirring wing (144) is slowly rotated to prevent a vertical flow. A large opening (147) is arranged on the top of the vessel (104). The opening (147) is usually closed, and is opened in an emergency (under an extraordinary pressure). A liquid level meter (148) and a manometer (149) are also attached to the vessel (104). The liquid level (142) is adjusted between the top (150) of the stirring wing (144) and the inlet (141).

A steam jacket (143) is arranged outside the vessel (104). The jacket (143) is divided into three parts (143a, 143b, 143c). A steam is controlled by controlled bulbs (151a, 151b, 151c), supplied to the jacket (143), and evacuated along a drain line (152). Thermometers (152a, 152b, 152c, 153a, 153b, 153c) are attached to the top, middle and bottom of the vessel (104) and the top, middle and bottom jackets (143a, 143b, 143c) respectively. An outlet (54) is attached to the bottom of the vessel. A solution made from the mixture is sucked by a pump (105).

The charge and discharge of the mixture as well as the supplement of a steam into the jacket can automatically be controlled in the apparatus shown in FIG. 6.

REFERENCE EXAMPLE 1

A solution of 26 weight parts of cellulose triacetate in 74 weight parts of acetone was prepared by using the apparatus shown in FIG. 1. At the swelling stage, 70 weight parts of acetone was used. The remaining 4 weight parts of acetone was used as a supplemental solvent at the cooling stage.

The obtained solution was observed to confirm that a transparent uniform solution was formed.

The processing conditions are shown below.
Temperature at the swelling stage: room temperature
Time of the swelling stage: 30 minutes Cooling rate: 10° C. per minute
Temperature of supplemental solvent: −80° C.
Final cooling temperature: −75 to −65° C.
Time of the cooling stage: 60 minutes
Warming rate: 10° C. per minute
Final warming temperature: 50° C.
Time of the warming stage: 60 minutes

COMPARISON EXAMPLE 1

A mixture of 26 weight parts of cellulose triacetate and 74 weight parts of acetone was stirred at 30° C. for 1 hour. As a result, cellulose triacetate was swelled in acetone, but was scarcely dissolved in acetone.

The swelled mixture was cooled to −70° C. by using a mixture of methanol and dry ice. The cooling rate was 0.4° C. per minute. The mixture was left for 2 hours at −70° C.

The cooled mixture was warmed to 50° C. for 5 hours while stirring the mixture. The warming rate was 0.4° C. per minute. The mixture was stirred at 50° C. for 3 hours.

As a result, most of cellulose triacetate was dissolved in acetone, however a part of cellulose triacetate was not dissolved in acetone and observed as a milky turbidity.

REFERENCE EXAMPLE 2

A solution of 18 weight parts of cellulose triacetate in 82 weight parts of methyl acetate was prepared by using the apparatus shown in FIG. 1. At the swelling stage, 75 weight parts of methyl acetate was used. The remaining 7 weight parts of methyl acetate was used as a supplemental solvent at the cooling stage.

The obtained solution was observed to confirm that a transparent uniform solution was formed.

The processing conditions are shown below.
Temperature at the swelling stage: room temperature
Time of the swelling stage: 45 minutes
Cooling rate: 12° C. per minute
Temperature of supplemental solvent: −50° C.
Final cooling temperature: −45 to −40° C.
Time of the cooling stage: 40 minutes
Warming rate: 8° C. per minute
Final warming temperature: 50° C.
Time of the warming stage: 50 minutes

REFERENCE EXAMPLE 3

A solution of 18 weight parts of cellulose triacetate in 62 weight parts of methyl acetate and 20 weight parts of ethanol was prepared by using the apparatus shown in FIG. 1. At the swelling stage, 75 weight parts of the mixture of methyl acetate and ethanol was used. The remaining 7 weight parts of the mixture of methyl acetate and ethanol was used as a supplemental solvent at the cooling stage.

The obtained solution was observed to confirm that a transparent uniform solution was formed.

The processing conditions are shown below.
Temperature at the swelling stage: room temperature
Time of the swelling stage: 60 minutes
Cooling rate: 12° C. per minute
Temperature of supplemental solvent: −50° C.
Final cooling temperature: −55 to −45° C.
Time of the cooling stage: 50 minutes
Warming rate: 10° C. per minute
Final warming temperature: 50° C.
Time of the warming stage: 60 minutes

REFERENCE EXAMPLE 4a

A solution of 28 weight parts of cellulose triacetate in 72 weight parts of acetone was prepared by using the apparatus shown in FIGS. 3 and 4.

The obtained solution was observed to confirm that a transparent uniform solution was formed.

The processing conditions are shown below.
Temperature at the swelling stage: room temperature
Time of the swelling stage: 30 minutes
Diameter of fibrous swelled mixture: 2 mm
Number of extruded fibers: 500
Extruded amount of swelled mixture: 20 l per minute
Cooling rate: 15° C. per second
Temperature of cooling liquid: −80° C.
Final cooling temperature: −75 to −65° C.
Time of the cooling stage: 4 seconds
Warming rate: 15° C. per second
Final warming temperature: 50° C.
Time of the warming stage: 20 seconds

COMPARISON EXAMPLE 2

A mixture of 28 weight parts of cellulose triacetate and 72 weight parts of acetone was stirred at 30° C. for 1 hour. As a result, cellulose triacetate was swelled in acetone, but was scarcely dissolved in acetone.

The swelled mixture was cooled to −70° C. by using a mixture of methanol and dry ice. The cooling rate was 0.4° C. per minute. The mixture was left for 2 hours at −70° C.

The cooled mixture was warmed to 50° C. for 5 hours while stirring the mixture. The warming rate was 0.4° C. per minute. The mixture was stirred at 50° C. for 3 hours.

As a result, most of cellulose triacetate was dissolved in acetone, however a part of cellulose triacetate was not dissolved in acetone and observed as a milky turbidity.

REFERENCE EXAMPLES 4b to 12d

The procedures of Example 4a were repeated except that the processing conditions were changed as is shown in Table 1 (4 to 12) and Table 2 (a to d) to prepare 36 (=9×4) polymer solutions including the solution of Example 4a. The conditions not shown in Tables 1 and 2 (such as the conditions at the swelling stage) are the same as the conditions in Example 4a.

The obtained solutions were observed to confirm that transparent uniform solutions were formed.

TABLE 1

| No. | %* | Composition of solvent | Weight ratio | Final cooling temperature |
|---|---|---|---|---|
| 4 | 28 | Acetone | 100 | −75 to −65° C. |
| 5 | 30 | Methyl acetate | 100 | −45 to −40° C. |
| 6 | 30 | Methyl acetate/ethanol | 80/20 | −75 to −65° C. |
| 7 | 18 | Methyl acetate/ethanol | 80/20 | −45 to −40° C. |
| 8 | 17 | MeAc/ethanol/butanol | 80/15/5 | −35 to −30° C. |
| 9 | 17 | MeAc/butanol/acetone | 75/20/5 | −35 to −30° C. |
| 10 | 17 | MeAc/EtOH/cyclohexane | 80/15/5 | −35 to −30° C. |
| 11 | 17 | MeAc/ethanol/methanol | 80/18/2 | −35 to −30° C. |
| 12 | 17 | MeAc/ethanol/propanol | 80/15/5 | −35 to −30° C. |

(Remark)
%*: Concentration of polymer solution
MeAc: Methyl acetate
EtOH: Ethanol

TABLE 2

| Sample No. | Fibers of mixture | | | Cooling stage | | Warming stage | |
| --- | --- | --- | --- | --- | --- | --- | --- |
| | Diam. | Number | Amount | Rate | Time | Rate | Time |
| a | 2 mm | 500 | 20 | 15 | 10 | 15 | 10 |
| b | 2 mm | 500 | 35 | 15 | 10 | 15 | 10 |
| c | 5 mm | 80 | 20 | 2 | 60 | 2 | 80 |
| d | 5 mm | 80 | 35 | 2 | 60 | 2 | 80 |

(Remark)
Diam.: Diameter of fibers
Amount: Extruded amount (liter per minute)
Rate: Cooling or warming rate (° C per second)
Time: Time of cooling or warming stage (second)

EXAMPLE 1a

A solution of 15.0 weight parts of polycarbonate in 85.0 weight parts of acetone was prepared by using the apparatus shown in FIGS. 5 and 6.

The obtained solution was observed to confirm that a transparent uniform solution was formed. The solution was placed in a glass vessel having the diameter of 40 mm, and the light transmittance was measured. As a result, the transmittance at 610 nm was 45 to 50%.

The processing conditions are shown below.
Temperature at the swelling stage: room temperature
Time of the swelling stage: 30 minutes
Cooling rate: 10° C. per minute
Temperature of cooling liquid: −80° C.
Final cooling temperature: −75° C.
Warming rate: 4° C. per minute
Final warming temperature: 120° C.
Pressure at the warming temperature: 8 kgw/cm$^2$

COMPARISON EXAMPLE 11

In 85.0 weight parts of acetone, 15.0 weight parts of polycarbonate was mixed. The mixture was stirred at 30° C. for 2 hours. Polycarbonate was swelled in acetone, but not dissolved in acetone.

EXAMPLE 1b

In 85.0 weight parts of acetone, 15.0 weight parts of polycarbonate was mixed. The mixture was stirred at 30° C. for 1 hour. Polycarbonate was swelled in acetone.

The swelled mixture was cooled to −70° C. by using a mixture of methanol and dry ice. The cooling rate was 0.4° C. per minute. The mixture was left for 2 hours at −70° C.

The cooled mixture was warmed to 50° C. for 5 hours while stirring the mixture. The warming rate was 0.4° C. per minute. The mixture was stirred at 50° C. for 3 hours.

The obtained solution was observed to confirm that a transparent uniform solution was formed. The solution was placed in a glass vessel having the diameter of 40 mm, and the light transmittance was measured. As a result, the transmittance at 610 nm was 45 to 50%.

EXAMPLE 2a

The procedures of Example 1a were repeated except that 15.0 weight parts of polystyrene was used in place of 15.0 weight parts of polycarbonate to prepare a polymer solution.

The obtained solution was observed to confirm that a transparent uniform solution was formed. The solution was placed in a glass vessel having the diameter of 40 mm, and the light transmittance was measured. As a result, the transmittance at 610 nm was 50% or more.

COMPARISON EXAMPLE 12

The procedures of Comparison Example 11 were repeated except that 15.0 weight parts of polystyrene was used in place of 15.0 weight parts of polycarbonate. The mixture was stirred at 30° C. for 2 hours.

As a result, a part of polystyrene was dissolved in acetone, however most of polystyrene was not dissolved (swelled) in acetone. The obtained mixture was placed in a glass vessel having the diameter of 40 mm, and the light transmittance was measured. As a result, the transmittance at 610 nm was 45% or less.

EXAMPLE 2b

The procedures of Example 1b were repeated except that 15.0 weight parts of polystyrene was used in place of 15.0 weight parts of polycarbonate.

As a result, polycarbonate was dissolved in acetone. The solution was placed in a glass vessel having the diameter of 40 mm, and the light transmittance was measured. As a result, the transmittance at 610 nm was 45 to 50%.

EXAMPLE 3a

The procedures of Example 1a were repeated except that 15.0 weight parts of polymethyl methacrylate was used in place of 15.0 weight parts of polycarbonate to prepare a polymer solution.

The obtained solution was observed to confirm that a transparent uniform solution was formed. The solution was placed in a glass vessel having the diameter of 40 mm, and the light transmittance was measured. As a result, the transmittance at 610 nm was 50% or more.

COMPARISON EXAMPLE 13

The procedures of Comparison Example 11 were repeated except that 15.0 weight parts of polymethyl methacrylate was used in place of 15.0 weight parts of polycarbonate. The mixture was stirred at 30° C. for 2 hours.

As a result, a part of polymethyl methacrylate was dissolved in acetone, however most of polymethyl methacrylate was not dissolved (swelled) in acetone. The obtained mixture was placed in a glass vessel having the diameter of 40 mm, and the light transmittance was measured. As a result, the transmittance at 610 nm was 45% or less.

EXAMPLE 3b

The procedures of Example 1b were repeated except that 15.0 weight parts of polymethyl methacrylate was used in place of 15.0 weight parts of polycarbonate.

As a result, polymethyl methacrylate was dissolved in acetone. The solution was placed in a glass vessel having the diameter of 40 mm, and the light transmittance was measured. As a result, the transmittance at 610 nm was 45 to 50%.

EXAMPLE 4a

The procedures of Example 3a were repeated except that 85.0 weight parts of methyl ethyl ketone was used in place of 85.0 weight parts of acetone to prepare a polymer solution.

The obtained solution was observed to confirm that a transparent uniform solution was formed. The solution was placed in a glass vessel having the diameter of 40 mm, and the light transmittance was measured. As a result, the transmittance at 610 nm was 50% or more.

COMPARISON EXAMPLE 14

The procedures of Comparison Example 13 were repeated except that 85.0 weight parts of methyl ethyl ketone was used in place of 85.0 weight parts of acetone. The mixture was stirred at 30° C. for 2 hours.

As a result, a part of polymethyl methacrylate was dissolved in methyl ethyl ketone, however most of polymethyl methacrylate was not dissolved (swelled) in methyl ethyl ketone. The obtained mixture was placed in a glass vessel having the diameter of 40 mm, and the light transmittance was measured. As a result, the transmittance at 610 nm was 45% or less.

EXAMPLE 4b

The procedures of Example 3b were repeated except that 85.0 weight parts of methyl ethyl ketone was used in place of 85.0 weight parts of acetone.

As a result, polymethyl methacrylate was dissolved in methyl ethyl ketone. The solution was placed in a glass vessel having the diameter of 40 mm, and the light transmittance was measured. As a result, the transmittance at 610 nm was 45 to 50%.

EXAMPLE 5

The procedures of Example 1a were repeated except that 15.0 weight parts of a norbornene polymer (Artone, Japan Synthetic Rubber Co., Ltd.) was used in place of 15.0 weight parts of polycarbonate to prepare a polymer solution.

The obtained solution was observed to confirm that a transparent uniform solution was formed. The solution was placed in a glass vessel having the diameter of 40 mm, and the light transmittance was measured. As a result, the transmittance at 610 nm was 50% or more.

COMPARISON EXAMPLE 15

The procedures of Comparison Example 11 were repeated except that 15.0 weight parts of a norbornene polymer (Artone, Japan Synthetic Rubber Co., Ltd.) was used in place of 15.0 weight parts of polycarbonate. The mixture was stirred at 30° C. for 2 hours.

As a result, a part of the norbornene polymer was dissolved in acetone, however most of the norbornene polymer was not dissolved (swelled) in acetone. The obtained mixture was placed in a glass vessel having the diameter of 40 mm, and the light transmittance was measured. As a result, the transmittance at 610 nm was 40%.

EXAMPLE 6

The procedures of Example 1a were repeated except that 15.0 weight parts of an aromatic polyamide was used in place of 15.0 weight parts of polycarbonate, and 85.0 weight parts of butyl acetate was used in place of 85.0 weight parts of acetone to prepare a polymer solution.

The obtained solution was observed to confirm that a transparent uniform solution was formed. The solution was placed in a glass vessel having the diameter of 40 mm, and the light transmittance was measured. As a result, the transmittance at 610 nm was 50% or more.

COMPARISON EXAMPLE 16

The procedures of Comparison Example 11 were repeated except that 15.0 weight parts of an aromatic polyamide was used in place of 15.0 weight parts of polycarbonate, and 85.0 weight parts of butyl acetate was used in place of 85.0 weight parts of acetone. The mixture was stirred at 30° C. for 2 hours.

As a result, a part of the aromatic polyamide was dissolved in butyl acetate, however most of the aromatic polyamide was not dissolved (swelled) in butyl acetate. The obtained mixture was placed in a glass vessel having the diameter of 40 mm, and the light transmittance was measured. As a result, the transmittance at 610 nm was 45%.

EXAMPLE 7

The procedures of Example 1a were repeated except that 15.0 weight parts of polysulfone (Victolex P-350, Amoco) was used in place of 15.0 weight parts of polycarbonate, and 85.0 weight parts of methyl ethyl ketone was used in place of 85.0 weight parts of acetone to prepare a polymer solution.

The obtained solution was observed to confirm that a transparent uniform solution was formed. The solution was placed in a glass vessel having the diameter of 40 mm, and the light transmittance was measured. As a result, the transmittance at 610 nm was 50% or more.

COMPARISON EXAMPLE 17

The procedures of Comparison Example 11 were repeated except that 15.0 weight parts of polysulfone (Victolex P-350, Amoco) was used in place of 15.0 weight parts of polycarbonate, and 85.0 weight parts of methyl ethyl ketone was used in place of 85.0 weight parts of acetone. The mixture was stirred at 30° C. for 2 hours.

As a result, a part of polysulfone was dissolved in methyl ethyl ketone, however most of the polysulfone was not dissolved (swelled) in methyl ethyl ketone. The obtained mixture was placed in a glass vessel having the diameter of 40 mm, and the light transmittance was measured. As a result, the transmittance at 610 nm was 35%.

EXAMPLE 8

The procedures of Example 1a were repeated except that 15.0 weight parts of polyethersulfone was used in place of 15.0 weight parts of polycarbonate to prepare a polymer solution.

The obtained solution was observed to confirm that a transparent uniform solution was formed. The solution was placed in a glass vessel having the diameter of 40 mm, and the light transmittance was measured. As a result, the transmittance at 610 nm was 50% or more.

COMPARISON EXAMPLE 18

The procedures of Comparison Example 11 were repeated except that 15.0 weight parts of polyethersulfone was used in place of 15.0 weight parts of polycarbonate. The mixture was stirred at 30° C. for 2 hours.

As a result, a part of polyethersulfone was dissolved in acetone, however most of polyethersulfone was not dissolved (swelled) in acetone. The obtained mixture was placed in a glass vessel having the diameter of 40 mm, and the light transmittance was measured. As a result, the transmittance at 610 nm was 40%.

EXAMPLES 9 to 19

The procedures of Example 1a were repeated except that the polymer, the solvent and the cooling temperature were changed according to Table 3 to prepare polymer solutions.

TABLE 3

| Example | Polymer (weight parts) | Solvent (weight parts) | Cooling Temp. |
|---|---|---|---|
| 9 | Polymethyl methacrylate (15.0) | Acetone (85.0) | −75° C. |
| 10 | Polyacrylamide (15.0) | Acetone (85.0) | −75° C. |
| 11 | Polymethacrylamide (15.0) | Acetone (85.0) | −75° C. |
| 12 | Polyvinyl alcohol (20.0) | Water (80.0) | 0° C. |
| 13 | Polyurea (15.0) | Butyl acetate (85.0) | −75° C. |
| 14 | Polyester (15.0) | Butyl acetate (85.0) | −75° C. |
| 15 | Polyurethane (15.0) | Butyl acetate (85.0) | −75° C. |
| 16 | Polyimide (15.0) | Butyl acetate (85.0) | −75° C. |
| 17 | Polyvinyl acetate (15.0) | Butyl acetate (85.0) | −75° C. |
| 18 | Polyvinyl formal (15.0) | Butyl acetate (85.0) | −75° C. |
| 19 | Gelatin (20.0) | Water (80.0) | 0° C. |

The obtained solutions were observed to confirm that transparent uniform solutions were formed.

We claim:

1. A process for the preparation of a polymer solution which comprises the steps of: (a) mixing a polymer, other than cellulose esters of lower fatty acids, with a solvent to swell the polymer in the solvent; (b) cooling the swelled mixture; and then (c) warming the cooled mixture to dissolve the polymer in the solvent.

2. The process as claimed in claim 1, wherein the polymer is selected from the group consisting of polyolefins, polyamides, polysulfones, polyethers, polystyrenes, polycarbonates, polyacrylic polymers, polyacrylamides, polymethacrylic polymers, polymethacrylamides, polyvinyl alcohols, polyureas, polyesters, polyurethanes, polyimides, polyvinyl acetates, polyvinyl acetals and proteins.

3. The process as claimed in claim 1, wherein the polymer is mixed with the solvent at a temperature of −10 to 55° C.

4. The process as claimed in claim 1, wherein the the swelled mixture is cooled to a temperature of −100 to −10° C.

5. The process as claimed in claim 1, wherein the the swelled mixture is cooled at a rate of faster than 1° C. per minute.

6. The process as claimed in claim 1, wherein the the cooled mixture is warmed to a temperature of 0 to 200° C.

7. The process as claimed in claim 1, wherein the the cooled mixture is warmed to a temperature of 0 to 120° C.

8. The process as claimed in claim 1, wherein the the cooled mixture is warmed at a rate of faster than 1° C. per minute.

9. The process of claim 1, wherein the solvent is an organic solvent.

10. The process of claim 9, wherein the organic solvent is selected from the group consisting of ketones, esters, ethers, hydrocarbons and alcohols.

11. The process of claim 1, wherein the solvent has a boiling point in the range of 20 to 300° C.

12. The process of claim 1, further comprising adding in step (a) one or more additives selected from the group consisting of plasticizers, deterioration inhibitors, dyes, and ultraviolet absorbents.

13. The process of claim 1, wherein the cooling step (b) is carried out in a closed system.

14. The process of claim 1, wherein the cooled mixture is warmed to a temperature of 0 to 55° C.

15. The process of claim 1, wherein the warming step (c) is carried out in a closed system.

16. The process of claim 1, further comprising adjusting the solution concentration after step (c).

17. The process of claim 1, further comprising adding one or more components selected from the group consisting of plasticizers, deterioration inhibitors, dyes and ultraviolet absorbents after step (c).

* * * * *